US012703770B2

(12) United States Patent
Haruta

(10) Patent No.: US 12,703,770 B2
(45) **Date of Patent: *Aug. 11, 2026**

(54) HEAT-SHRINKABLE POLYESTER FILM, HEAT-SHRINKABLE LABEL, AND PACKAGE PRODUCT

(71) Applicant: TOYOBO CO., LTD., Osaka (JP)

(72) Inventor: Masayuki Haruta, Tsuruga (JP)

(73) Assignee: TOYOBO CO., LTD., Osaka (JP)

( * ) Notice: Subject to any disclaimer, the term of this patent is extended or adjusted under 35 U.S.C. 154(b) by 545 days.

This patent is subject to a terminal disclaimer.

(21) Appl. No.: 18/042,516

(22) PCT Filed: Aug. 19, 2021

(86) PCT No.: PCT/JP2021/030389

§ 371 (c)(1),
(2) Date: Feb. 22, 2023

(87) PCT Pub. No.: WO2022/044959

PCT Pub. Date: Mar. 3, 2022

(65) Prior Publication Data

US 2023/0323021 A1 Oct. 12, 2023

(30) Foreign Application Priority Data

Aug. 27, 2020 (JP) ................................. 2020-143696

(51) Int. Cl.

*C08G 63/183* (2006.01)
*C08J 5/18* (2006.01)
*C08L 67/02* (2006.01)

(52) U.S. Cl.

CPC .............. *C08G 63/183* (2013.01); *C08J 5/18* (2013.01); *C08L 67/02* (2013.01); *C08J 2367/02* (2013.01);

(Continued)

(58) Field of Classification Search

CPC ................................ C08G 63/183; C09J 5/18
See application file for complete search history.

(56) References Cited

U.S. PATENT DOCUMENTS 4,983,653 A 1/1991 Fukuda et al.
4,985,538 A 1/1991 Fukuda et al.

(Continued)

FOREIGN PATENT DOCUMENTS

CN 107922642 A 4/2018
CN 110291130 A 9/2019

(Continued)

OTHER PUBLICATIONS

Japan Patent Office, International Search Report in International Patent Application No. PCT/JP2021/030389 (Oct. 26, 2021).

(Continued)

*Primary Examiner* — Michael L Leonard
(74) *Attorney, Agent, or Firm* — Leydig, Voit & Mayer, Ltd.

(57) ABSTRACT

The invention provides a heat-shrinkable polyester film with high heat shrinkage ratio in a main shrinkage direction and is also satisfactorily recyclable with used beverage PET bottles to produce a recycled PET resin. The heat-shrinkable polyester film comprises 95-100 mol % of dicarboxylic acid and 0-5 mol % of isophthalic acid in 100 mol % of whole dicarboxylic acid component, 85-98 mol % of ethylene terephthalate unit in 100 mol % of whole ester unit, and 2-15 mol % of diethylene glycol in 100 mol % of whole polyol component, wherein the film has the predetermined hot-water heat shrinkage ratio, as well as the melting peak temperature, the amount of exothermic heat in crystallizing, and the amount of endothermic heat in melting within the predetermined range which are determined through differ- (Continued)

Exemplary DSC curve ential scanning calorimetry (DSC) in heating the film to be melted, quenching the film, and re-heating the film.

6 Claims, 2 Drawing Sheets

(52) U.S. Cl.
CPC ..... *C08L 2205/025* (2013.01); *C08L 2205/03* (2013.01)

(56) References Cited

U.S. PATENT DOCUMENTS

| | | | |
|---|---|---|---|
| 5,340,624 | A | 8/1994 | Sublett |
| 6,610,378 | B1 | 8/2003 | Kimura et al. |
| 8,632,865 | B2 | 1/2014 | Kim et al. |
| 10,421,231 | B2 | 9/2019 | Inoue et al. |
| 10,934,403 | B2 | 3/2021 | Inoue et al. |
| 2001/0051238 | A1 | 12/2001 | Ito et al. |
| 2005/0010018 | A1 | 1/2005 | Kim et al. |
| 2009/0227735 | A1 | 9/2009 | Shih et al. |
| 2010/0093938 | A1 | 4/2010 | Mukoyama et al. |
| 2011/0224369 | A1 | 9/2011 | Kim et al. |
| 2012/0043248 | A1 | 2/2012 | Haruta et al. |
| 2012/0100363 | A1 | 4/2012 | Yamamoto et al. |
| 2015/0175756 | A1 | 6/2015 | Haruta et al. |
| 2015/0218308 | A1 | 8/2015 | Haruta et al. |
| 2018/0229422 | A1 | 8/2018 | Inoue et al. |
| 2019/0169386 | A1 | 6/2019 | Inoue et al. |
| 2019/0210262 | A1 | 7/2019 | Haruta et al. |
| 2019/0375552 | A1* | 12/2019 | Haruta ................. B65D 25/205 |
| 2021/0053327 | A1 | 2/2021 | Nozaki |
| 2021/0229410 | A1* | 7/2021 | Ishimaru ................. B32B 27/34 |
| 2022/0274731 | A1 | 9/2022 | Inoue et al. |
| 2023/0151146 | A1 | 5/2023 | Haruta |

FOREIGN PATENT DOCUMENTS

| | | | |
|---|---|---|---|
| EP | 1491576 | A1 | 12/2004 |
| EP | 4005941 | A1 | 6/2022 |
| EP | 4151553 | A1 | 3/2023 |
| JP | S63-309424 | A | 12/1988 |
| JP | H03-045631 | A | 2/1991 |
| JP | H03-142224 | A | 6/1991 |
| JP | H05-138737 | A | 6/1993 |
| JP | H07-053737 | A | 2/1995 |
| JP | H08-239460 | A | 9/1996 |
| JP | H09-501713 | A | 2/1997 |
| JP | H09-309147 | A | 12/1997 |
| JP | 2003-082128 | A | 3/2003 |
| JP | 2003-154539 | A | 5/2003 |
| JP | 2007-056156 | A | 3/2007 |
| JP | 4552097 | B2 | 9/2010 |
| JP | 2011-513550 | A | 4/2011 |
| JP | 2011-184690 | A | 9/2011 |
| JP | 5286763 | B2 | 9/2013 |
| JP | 2014-055236 | A | 3/2014 |
| JP | 5625912 | B2 | 11/2014 |
| JP | 5633808 | B2 | 12/2014 |
| JP | 2018-122438 | A | 8/2018 |
| JP | 6544492 | B2 | 7/2019 |
| JP | 2019-178263 | A | 10/2019 |
| WO | 2014/021120 | A1 | 2/2014 |
| WO | 2014/034704 | A1 | 3/2014 |
| WO | WO 2020/021948 | A1 | 1/2020 |
| WO | WO 2020/076749 | A1 | 4/2020 |

OTHER PUBLICATIONS

European Patent Office, Extended European Search Report in European Patent Application No. 21861387.5 (Aug. 2, 2024).

China National Intellectual Property Administration, Office Action in Chinese Patent Application No. 202180051882.2 (Feb. 12, 2025).

China National Intellectual Property Administration, First Office Action in Chinese Patent Application No. 202180034236.5 (Apr. 27, 2023).

China National Intellectual Property Administration, Second Office Action in Chinese Patent Application No. 202180034236.5 (Nov. 14, 2023).

European Patent Office, Extended European Search Report in European Patent Application No. 16832982.9 (Mar. 14, 2019).

European Patent Office, Extended European Search Report in European Patent Application No. 21803889.1 (May 7, 2024).

Indonesian Directorate General of Intellectual Property, Examination Report in Indonesian Patent Application No. P00202214505 (Oct. 10, 2024).

Intellectual Property Office of Vietnam, Office Action in Vietnamese Patent Application No. 1-2022-08012 (Jun. 18, 2024).

Japan Patent Office, International Search Report in International Patent Application No. PCT/JP2016/072480 (Oct. 25, 2016).

Japan Patent Office, International Search Report in International Patent Application No. PCT/JP2017/027695 (Oct. 17, 2017).

Japan Patent Office, International Search Report in International Patent Application No. PCT/JP2021/017726 (Jul. 13, 2021).

China National Intellectual Property Administration, Office Action in Chinese Patent Application No. 202180051882.2 (Sep. 1, 2025).

Intellectual Property India, Examination Report in Indian Patent Application No. 202247066932 (Dec. 1, 2025).

Korean Intellectual Property Office, Office Action in Korean Patent Application No. 10-2022-7041623 (Nov. 19, 2025).

Intellectual Property India, Examination Report in Indian Patent Application No. 202347015423 (Jun. 3, 2026).

Intellectual Property India, Hearing Notice in Indian Patent Application No. 202247066932 (Jun. 16, 2026).

* cited by examiner

HEAT-SHRINKABLE POLYESTER FILM, HEAT-SHRINKABLE LABEL, AND PACKAGE PRODUCT

TECHNICAL FIELD

The present invention relates to a heat-shrinkable polyester film. Specifically, the present invention relates to a heat-shrinkable polyester film, and a heat-shrinkable label and a package product comprising the film, which are satisfactorily recyclable as a PET resin through mixing with PET bottles in a recycling process of the PET bottles.

BACKGROUND ART

In recent years, stretched films (so-called heat-shrinkable films) made of polyvinyl chloride resins, polystyrene resins, or polyester resins have been widely used for applications such as label packaging to protect glass or PET bottles and display products information, cap sealing, or integrated packaging. Among such heat-shrinkable films, polyvinyl chloride films have low heat resistance, and causes hydrogen chloride gas and dioxins during incineration. Polystyrene films have low solvent resistance and thus require inks with special composition for printing, need to be incinerated at high temperatures, and disadvantageously cause a large amount of black smoke with an offensive odor during incineration. Therefore, polyester heat-shrinkable films that has high heat resistance, are easily incinerated, and have excellent solvent resistance, have been widely used as shrinkable labels, and the use amount thereof has been increasing with an increase in the distribution amount of PET containers.

Heat-shrinkable polyester films shrinking significantly in a width direction has been widely used. The film is stretched in a method such as a tenter method, made into a wide master roll, and the master roll is wound into a roll at any winding length while being slit at any width, to produce a film roll product. The film is then subjected to a printing process in the shape of a roll for imparting design properties and displaying products' information. After printing, the film is re-slit in the required width and wound into a roll, then made into a tubular shape in the process of center sealing with solvent adhesion, and wound into a roll to form a roll of the label.

The rolled-up and tubular-shaped label is cut in the required length to form an annular-shaped label while being unwound from the roll. The annular-shaped label is hand-covered to an object for packaging, and heat-shrunk through a steam tunnel or a hot air tunnel to become a label.

In recent years, there has been a strong demand for environmental protection. For example, containers of PET bottles are recycled as a recycled PET resin, and the recycled PET resin is used in various plastic products. The use amount of recycled PET resin and a recycling ratio of PET bottles have been increasing with an increase in the strong demand for environmental protection.

Empty beverage PET bottles are recycled to a recycled PET resin, however, labels, which impart design properties to beverage PET bottles, are not recycled in general.

PTL 1 discloses a label of heat-shrinkable polystyrene film, and such a label is incompatible with PET, which is a raw material of PET bottles. Therefore, mixing of polystyrene heat-shrinkable film in the production process of recycled PET resin undesirably leads to a loss of transparency of recycled PET resin.

PTL 2 discloses a laminated film of polyester and polystyrene, and the film similarly and undesirably contains polystyrene, which is incompatible with PET.

PTL 3 discloses a heat-shrinkable polyester film, however, the film contains a cyclic olefin to form a void. The olefin raw materials are similarly and undesirably incompatible with PET, too.

PTL 4 discloses a transparent heat-shrinkable polyester film. The absence of the raw material incompatible with PET enables the transparency of recycled PET resin not to be lost during the production process of the recycled PET resin. However, in general, heat-shrinkable polyester films are produced from an amorphous PET raw material containing an amorphous monomer to develop heat shrinkage properties. PET bottles are produced from homo PET, which is a crystalline raw material. Therefore, the mixture of amorphous heat-shrinkable polyester film in the production process of recycled PET resin leads to recycled PET resin non-recyclable as a homo PET raw material, resulting in non-reusable raw material to produce PET bottles. A crystalline raw material and an amorphous raw material have different density with each other. Thus, the mixture of the raw materials in a production process of recycled resin leads to uneven extrusion of amorphous raw material, resulting in troubles such as pulsation or cutting of tow in a die after melt-extrusion.

CITATION LIST

Patent Literature

PTL 1: JP-B2-5286763
PTL 2: WO-A1-2020/021948
PTL 3: JP-B2-5625912
PTL 4: JP-B2-5633808

SUMMARY OF THE INVENTION

Problems to be Solved by the Invention

It is an object of the present invention to provide a heat-shrinkable polyester film having high heat shrinkage ratio in a main shrinkage direction as well as satisfactorily recyclable together with used beverage PET bottles to produce a recycled PET resin.

Solution to the Problems

The present invention that solved above problems has the following features.

1. A heat-shrinkable polyester film, comprising, 95 mol % or more and 100 mol % or less of dicarboxylic acid, and 0 mol % or more and 5 mol % or less of isophthalic acid in 100 mol % of whole dicarboxylic acid component, 85 mol % or more and 98 mol % or less of ethylene terephthalate unit in 100 mol % of whole ester unit, and 2 mol % or more and 15 mol % or less of diethylene glycol in 100 mol % of whole polyol component, and satisfying the requirements (1) to (5):

(1) a hot-water heat shrinkage ratio in a width direction of the film is 40% or more and 70% or less by immersing the film in a hot water at 90° C. for 10 seconds, (2) a hot-water heat shrinkage ratio in a longitudinal direction of the film is −5% or more and 15% or less by immersing the film in a hot water at 90° C. for 10 seconds, (3) an endothermic peak temperature in melting is 245° C. or higher and 260° C. or lower through differential scanning calorimetry (DSC) in heating the film to 300° C. to be melted, quenching the film, and then re-heating the film to 300° C., (4) an amount of exothermic heat in crystallizing is 10 mJ/mg or more through differential scanning calorimetry (DSC) in heating the film to 300° C. to be melted, quenching the film, and then re-heating the film to 300° C., and (5) an amount of endothermic heat in melting is 10 mJ/mg or more through differential scanning calorimetry (DSC) in heating the film to 300° C. to be melted, quenching the film, and then re-heating the film to 300° C.

2. The heat-shrinkable polyester film according to 1, wherein a density of the film is 1.33 g/cm$^3$ or more and 1.39 g/cm$^3$ or less.

3. The heat-shrinkable polyester film according to 1 or 2, wherein a haze of the film is 2% or more and 10% or less at a film thickness of 20 μm.

4. A heat-shrinkable label, comprising the heat-shrinkable polyester film according to any one of 1 to 3.

5. A package product, characterized in that the package product is produced by covering at least a part of periphery of an object for packaging with the heat-shrinkable label according to 4, and then shrinking the heat-shrinkable label by heat.

6. The heat-shrinkable polyester film according to any one of 1 to 3, the film made into a heat-shrinkable label is recyclable as a raw material for PET bottles.

Advantageous Effects of the Invention

The heat-shrinkable polyester film of the present invention has not only high heat shrinkage ratio in the main shrinkage direction, but also similar raw material component, and similarities in melting point, amount of exothermic heat, and amount of endothermic heat, which is measured by differential scanning calorimeter (hereinafter, merely "DSC" in some cases), to raw material for beverage PET bottles. Therefore, even when the heat-shrinkable polyester film is recycled together with PET bottles, a recycled PET resin can be produced.

DESCRIPTION OF EMBODIMENTS

Figure 1:
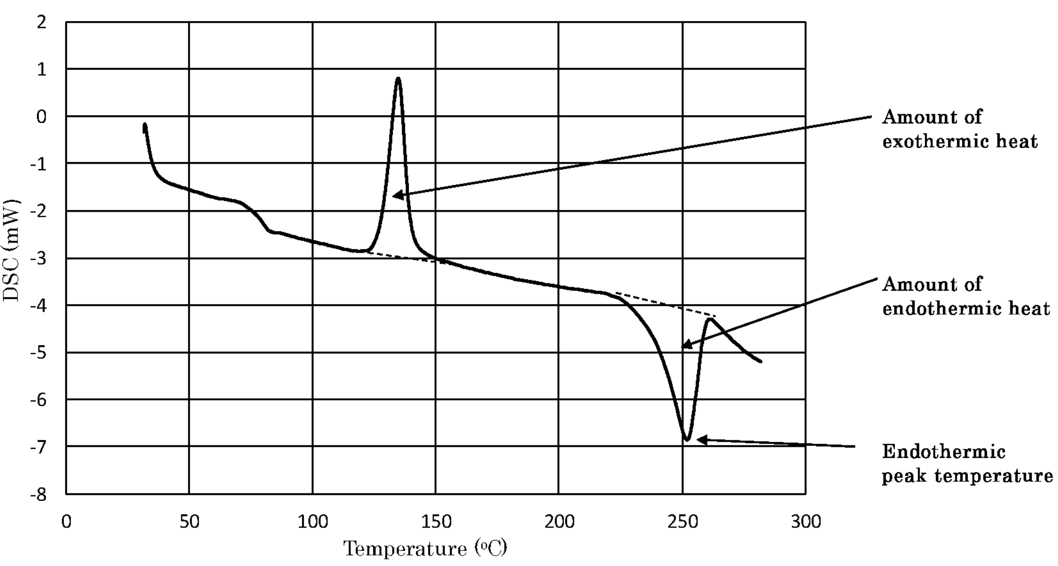
FIG. 1 illustrates an example of measuring for an endothermic peak temperature, amount of exothermic heat in crystallizing, and amount of endothermic heat in melting of the film by DSC in the present invention.
Figure 2:
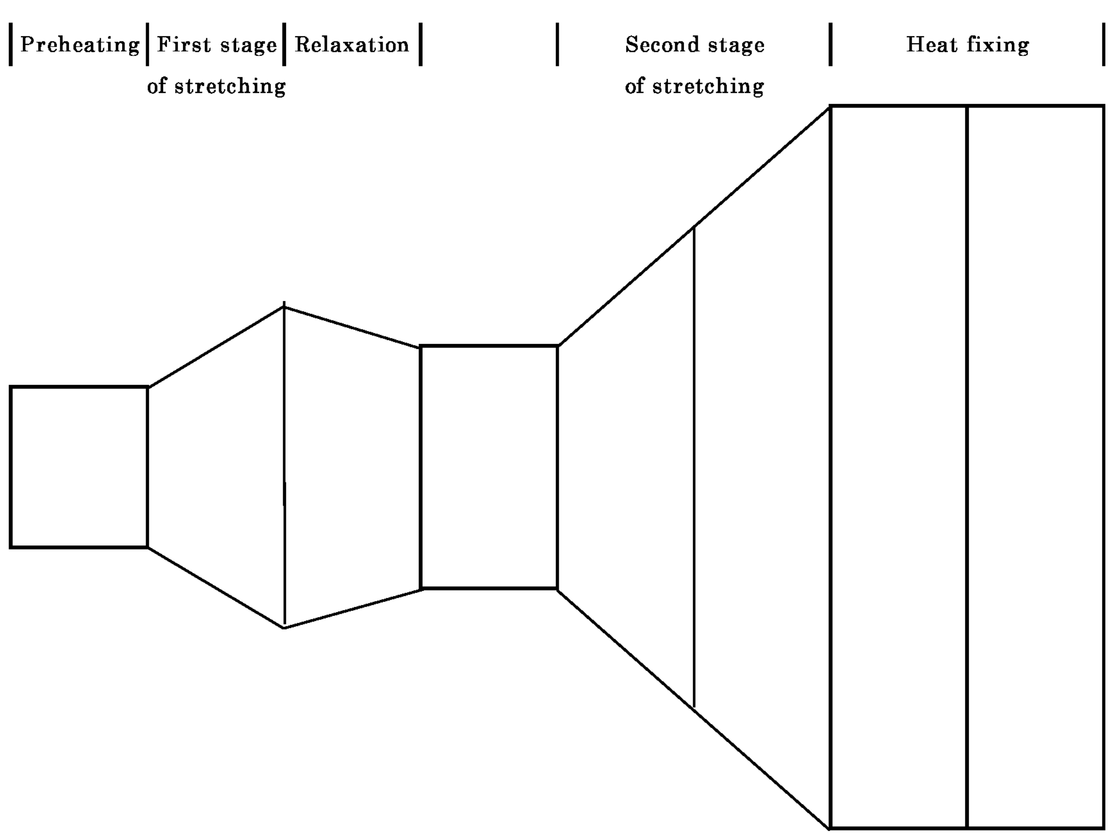
FIG. 2 is a top view illustrating an exemplary stretching pattern in TD (stretching in width direction) in the production process of the heat-shrinkable polyester film of the present invention.

Hereinafter, the heat-shrinkable polyester film of the present invention will be described in detail. The method for producing the heat-shrinkable film will be described later, and the heat-shrinkable film is generally produced through conveyance and stretching with rolls. The direction of the film conveyance denotes a longitudinal direction, and a direction orthogonal to the longitudinal direction denotes a width direction of the film. Accordingly, in the following, a width direction of the heat-shrinkable polyester film indicates a vertical direction to an unwinding direction of a roll, and a longitudinal direction of the film indicates a parallel direction to the unwinding direction of a roll.

The heat-shrinkable polyester film of the present invention comprises 85 mol % or more and 98 mol % or less of ethylene terephthalate unit in 100 mol % of whole ester unit; 95 mol % or more and 100 mol % or less of dicarboxylic acid and 0 mol % or more and 5 mol % or less of isophthalic acid in 100 mol % of whole dicarboxylic acid component; and 2 mol % or more and 15 mol % or less of diethylene glycol in 100 mol % of whole polyol component, and satisfying the requirements (1) to (5):

(1) a hot-water heat shrinkage ratio in a width direction of the film is 40% or more and 70% or less by immersing the film in a hot water at 90° C. for 10 seconds, (2) a hot-water heat shrinkage ratio in a longitudinal direction of the film is −5% or more and 15% or less by immersing the film in a hot water at 90° C. for 10 seconds, (3) an endothermic peak temperature in melting is 245° C. or higher and 260° C. or lower through differential scanning calorimetry (DSC) in heating the film to 300° C. to be melted, quenching the film, and then re-heating the film to 300° C., (4) an amount of exothermic heat in crystallizing is 10 mJ/mg or more through differential scanning calorimetry (DSC) in heating the film to 300° C. to be melted, quenching the film, and then re-heating the film to 300° C., and (5) an amount of endothermic heat in melting is 10 mJ/mg or more through differential scanning calorimetry (DSC) in heating the film to 300° C. to be melted, quenching the film, and then re-heating the film to 300° C.

The inventors analyzed commercially available beverage PET bottles (sold by The Coca-Cola Company, Suntory Holdings Limited, ITO EN, LTD., Kirin Holdings Company, Limited, and Asahi Group Holdings, Ltd.) to determine the composition of raw materials by 1H-NMR (UNITY50, manufactured by Varian Medical Systems, Inc.). The PET bottles contained 97 to 98.5 mol % of dicarboxylic acid and 1.5 to 3 mol % of isophthalic acid in 100 mol % of whole dicarboxylic acid component. The PET bottles contained 97 to 99 mol % of ethylene terephthalate unit in 100 mol % of whole ester unit, and 1 to 3 mol % of diethylene glycol in 100 mol % of whole polyol component. Isophthalic acid is thought to be intentionally added to avoid whitening of a neck portion during the molding of PET bottles. Diethylene glycol is thought to be a byproduct of the polymerization of raw materials.

Accordingly, similarly in the heat-shrinkable polyester film, the raw materials that only comprise dicarboxylic acid and isophthalic acid as dicarboxylic acid components, ethylene terephthalate unit as an ester unit, and diethylene glycol is preferable in terms of facilitated recyclability together with PET bottles.

The inventors also compared the weights of PET bottles and labels using beverage PET bottles with 500 ml capacity. The labels had low weight ratio of 0.05 to 0.2 to the weight ratio 1 of PET bottles. Although labels have low weight ratio in the mixture with PET bottles for recycling, the inventors found that the composition and the properties of labels caused a variation of resin size in the recycling process.

In heat-shrinkable polyester films, for high shrinkability, for example, a technique of copolymerizing a homopolymer (PET) consisting of ethylene terephthalate with other polycarboxylic acid components or other polyol components is widely used. The polyol component for the copolymerization is considered to be exemplified by neopentylglycol or 1,4-cyclohexanedimethanol, and they are widely used. The film produced by copolymerizing these components has a different composition of raw materials from the above-mentioned composition of raw materials of the PET bottles, undesirably leading to poor recyclability with PET bottles.

The polyethylene terephthalate (hereinafter merely "PET" in some cases) may be produced in any method such as a direct polymerization method in which terephthalic acid, ethylene glycol, optionally other dicarboxylic acid components and optionally other diol components directly react; or a transesterification method in which a dimethyl ester of terephthalic acid (optionally comprising methyl esters of other dicarboxylic acids) and ethylene glycol (optionally comprising other glycol components) are transesterified.

In addition to terephthalic acid, examples of the dicarboxylic acid components constituting the polyester include aromatic dicarboxylic acids such as isophthalic acid, naphthalenedicarboxylic acid, and orthophthalic acid; aliphatic dicarboxylic acids such as adipic acid, azelaic acid, sebacic acid, and decanedicarboxylic acid; and alicyclic dicarboxylic acids. The heat-shrinkable polyester film of the present invention preferably comprises isophthalic acid, which is the same component as the raw material of PET bottles. The content rate of isophthalic acid component in 100 mol % of whole polycarboxylic acid components is 0 mol % or more, preferably 1 mol % or more, and more preferably 1.5 mol % or more, which is the same composition rate as the raw material for PET bottles. Since the weight of the label is 5 to 20% with respect to PET bottles, the upper limit is not preferable at 15 mol %, which is 5 times as much as the content of isophthalic acid in PET bottles. Isophthalic acid is amorphous, and increased amount of isophthalic acid leads to high amorphousness, causing problems such as pulsation to occur in the process for producing the recycled PET raw material through mixing the film with PET bottles. The content rate of isophthalic acid is 5 mol % or less, preferably 4 mol % or less, and more preferably 3 mol % or less, which is the same composition rate as the raw material for PET bottles.

The film of the present invention needs to comprise diethylene glycol in an amount of 2 mol % or more and 15 mol % or less in 100 mol % of whole polyol component constituting the polyester for the film.

The amount of diethylene glycol of less than 2 mol % does not develop shrinkage properties as a heat-shrinkable film, undesirably. The amount of diethylene glycol is preferably 3 mol % or more, and more preferably 4 mol % or more.

The upper limit is determined based on the label weight accounting for 5 to 20% of the weight of PET bottles as described above. This means that the amount of the diethylene glycol derived from the label becomes ⅕ to 1/20 or less after mixing with PET bottles in the recycling process. As described above, raw materials for PET bottles contain diethylene glycol in an amount of 1 to 3 mol %, therefore, if the content of diethylene glycol in the recycled PET resin is 15 mol % or less, the content in the resin raw material for PET bottles will fall within the range of diethylene glycol of PET bottle resin. The amount of diethylene glycol is preferably 13 mol % or less, and more preferably 11 mol % or less.

The polyester is preferably free from diol having 8 or more of carbon atoms such as octanediol, or polyols having three or more valences such as trimethylolpropane, trimerytolethane, glycerin, and diglycerol. The heat-shrinkable polyester film produced from polyester containing these diols or polyols will have difficulty in attaining required high shrinkage.

The resin forming the heat-shrinkable polyester-based film of the present invention may contain additives such as waxes, antioxidants, antistatic agents, crystal nucleating agents, viscosity reducing agents, heat stabilizers, coloring pigments, color inhibitor, ultraviolet absorbers, if needed.

The resin forming the heat-shrinkable polyester-based film of the present invention may preferably contain lubricants of fine particles to improve workability such as slipperiness of the film. Any type of fine particles may be selected, and examples of the fine particles include inorganic fine particles such as silica, alumina, titanium dioxide, calcium carbonate, kaolin, and barium sulfate, and organic fine particles such as acrylic resin particles, melamine resin particles, silicone resin particles, and cross-linked polystyrene particles. The fine particles may desirably have an average particle diameter ranging from 0.05 to 3.0 μm measured by a Coulter counter, if needed.

The fine particles may be preferably added to the resin forming the heat-shrinkable polyester-based film at any step of polyester resin production. The fine particles are added preferably in the form of a slurry dispersed in ethylene glycol during the step of esterification or after the finish of transesterification and before the start of polycondensation, to proceed polycondensation reaction. The fine particles may be preferably blended with the polyester resin raw materials in the form of a slurry dispersed in ethylene glycol or water with vented kneading extruder, or dried fine particles may be preferably blended with the polyester resin raw materials with kneading extruder.

The heat shrinkage ratio (i.e., the hot-water heat shrinkage ratio at 90° C.) in the main shrinkage direction of the heat-shrinkable polyester film of the present invention is preferably 40% or more and 70% or less by immersing the film in a hot water at 90° C. for 10 seconds with no load. The heat shrinkage ratio is calculated from the film length before and after shrinkage according to Equation 1.

$$\text{heat shrinkage ratio}=\{(\text{length before shrinkage}-\text{length after shrinkage})/\text{length before shrinkage}\}\times 100(\%) \quad \text{Equation 1:}$$

The hot-water heat shrinkage ratio at 90° C. in the main shrinkage direction of less than 40% leads to low shrinkage for applications such as beverage labels or films covering box lunch containers, and thus undesirably causes wrinkles and looseness of the label after heat-shrunk. The hot-water heat shrinkage ratio at 90° C. is more preferably 43% or more, particularly preferably 46% or more, and most preferably 50% or more.

The hot-water heat shrinkage ratio at 90° C. in the main shrinkage direction of more than 70% may be allowed. However, the film with the hot-water heat shrinkage ratio at 90° C. of more than 70% could not be produced in the present invention. Therefore, the upper is determined to be 70%.

The hot-water heat shrinkage ratio at 90° C. in the longitudinal direction, which is orthogonal to the main shrinkage direction, of the heat-shrinkable polyester film of the present invention is preferably −5% or more and 15% or less. The hot-water heat shrinkage ratio at 90° C. in the longitudinal direction of less than −5% will stretch the label, undesirably causing the length of the label in PET bottles to be increased in the application of beverage labels. The hot-water heat shrinkage ratio at 90° C. in the longitudinal direction is more preferably −4% or more, and particularly preferably −3% or more.

The hot-water heat shrinkage ratio at 90° C. in the longitudinal direction of more than 15% will shrink the label, undesirably causing the length of the label in PET bottles to be decreased in the application as beverage labels. In addition, distortion of heat-shrunk label will be caused. The hot-water heat shrinkage ratio at 90° C. in the longitudinal direction is more preferably 13% or less, further preferably 11% or less, particularly preferably 8% or less, and most preferably 5% or less.

The endothermic peak temperature in melting of the heat-shrinkable polyester film of the present invention is preferably 245° C. or higher and 260° C. or lower through differential scanning calorimetry (DSC) in heating the film to 300° C. to be melted, quenching the film, and then re-heating the film to 300° C. The endothermic peak temperature of PET bottles measured by the same method was from 250 to 260° C. A large difference between the endothermic peak temperatures of the film and PET bottles undesirably causes problems such as pulsation in the melt extrusion process of recycled PET resin production. The peak temperature is more preferably 247° C. or higher and 260° C. or lower, and particularly preferably 250° C. or higher and 255° C. or lower.

The amount of exothermic heat in crystallizing of the heat-shrinkable polyester film of the present invention is preferably 10 mJ/mg or more through differential scanning calorimetry (DSC) in heating the film to 300° C. to be melted, quenching the film, and then re-heating the film to 300° C. The amount of exothermic heat of PET bottles measured by the same method was from 25 to 55 mJ/mg. A heat-shrinkable polyester film containing high amount of amorphous component will not show the amount of exothermic heat and thus undesirably causes problems such as pulsation in the melt extrusion process of recycled PET resin production.

Accordingly, the amount of exothermic heat in crystallizing is preferably 10 mJ/mg or more, more preferably 20 mJ/mg or more, and particularly preferably 25 mJ/mg or more.

The upper limit of the amount of exothermic heat in crystallizing is not particularly limited, but polyester raw materials do not generally have the amount of exothermic heat in crystallizing of more than 60 mJ/mg.

The amount of endothermic heat in melting of the heat-shrinkable polyester film of the present invention is preferably 10 mJ/mg or more through differential scanning calorimetry (DSC) in heating the film to 300° C. to be melted, quenching the film, and then re-heating the film to 300° C. The amount of endothermic heat of PET bottles measured by the same method was from 30 to 65 mJ/mg. A heat-shrinkable polyester film containing high amount of amorphous component will not show the amount of endothermic heat and thus undesirably causes problems such as pulsation in the melt extrusion process of recycled PET resin production.

Accordingly, the amount of endothermic heat in melting is preferably 10 mJ/mg or more, more preferably 20 mJ/mg or more, and particularly preferably 30 mJ/mg or more.

The upper limit of the amount of endothermic heat in melting is not particularly limited, but polyester raw materials do not generally have the amount of endothermic heat of more than 70 mJ/mg.

The density of the heat-shrinkable polyester film of the present invention is preferably 1.33 g/cm$^3$ or more. Density has been reported as an indicator of the degree crystallinity in a number of reports. Accordingly, low density indicates low degree of crystallinity and high amount of amorphous component.

The density of less than 1.33 g/cm$^3$ will undesirably cause problems such as pulsation in the melt extrusion process of recycled PET resin production. The density is more preferably 1.34 g/cm$^3$ or more, and particularly preferably 1.35 g/cm$^3$ or more.

Too high density will bring about crystallization and fails to attain shrinkage properties described above. The density is more preferably 1.38 g/cm$^3$ or less, and particularly preferably 1.37 g/cm$^3$ or less.

The thickness of the heat-shrinkable polyester film of the present invention is not particularly limited, and is preferably 15 to 50 μm for the heat-shrinkable film for labels application or box lunch packaging application. The film thickness of less than 15 μm significantly decreases stiffness of the film, leading to wrinkles of the film roll. In contrast, the thick film may be allowed for a film roll, however, a thinner film is preferable from the view point of cost. The film thickness is more preferably 17 to 45 μm, and particularly preferably 20 μm to 40 μm.

The haze of the heat-shrinkable polyester film of the present invention is preferably 2% or more and 10% or less at the film thickness of 20 μm. The heat-shrinkable film imparts design properties to PET bottles, and the label having the haze of more than 10% will prevent the contents of PET bottles to be clearly visible, undesirably resulting in degraded design properties. The haze is more preferably 8% or less, and particularly preferably 6% or less, at the film thickness of 20 μm.

The haze of less than 2% at the film thickness of 20 μm may be allowed. However, in the present invention, the haze of less than 2% degraded slipperiness of the film, therefore, the lower limit is determined to be 2%.

The heat-shrinkable polyester film of the present invention is produced by melt extruding the polyester raw materials from an extruder to form an unstretched film, and then stretching the unstretched film in the width direction. The polyester is produced through polycondensation reaction of appropriate dicarboxylic acid components and diol components by a known method. In general, chip-shaped polyester is used as a raw material for the film.

The polyester raw materials are preferably dried with dryers such as a hopper dryer, a paddle dryer, or a vacuum dryer in melt extrusion of resin raw materials. The dried polyester raw materials are melted at 230 to 270° C. and extruded into a film by an extruder. The film may be extruded in any know method such as a T-die method and a tubular method.

The unstretched film is produced by rapidly cooling the sheet-shaped melted resin after extrusion. Preferably, the melted resin may be rapidly cooled by a method involving solidification of the melted resin cast onto a rotating drum from a nozzle to form a substantially unoriented sheet.

Thus produced unstretched film may be further stretched in the width direction under prescribed conditions described later to produce the heat-shrinkable polyester film of the present invention. Hereinafter, preferred stretching conditions to produce the heat-shrinkable polyester film of the present invention will be described.

In general, a heat-shrinkable polyester film is produced by stretching an unstretched film in the direction desired to shrink. In the present invention, production speed will be increased by further stretching in the longitudinal direction and thus productivity will be improved, therefore, the film is biaxially stretched within the stretching ratio described later.

The stretching in the longitudinal direction is preferably conducted by roll stretching using rolls with different speeds. The film is preheated with a roll having a surface temperature set at Tg or higher and Tg+20° C. or lower, and stretched at a ratio of 1.1 or more and 1.3 or less. The surface temperature of Tg or lower is not preferable due to breakage caused by high stretching stress. The surface temperature higher than Tg+20° C. will cause the film to be sticked to a roll and will undesirably cause damages on the film. The surface temperature of a roll is preferably Tg+3° C. or higher and Tg+17° C. or lower, and particularly preferably Tg+5° C. or higher and Tg+15° C. or lower.

The stretching ratio of less than 1.1 will undesirably lead to small improvement in productivity. The stretching ratio is preferably 1.15 or more, and particularly preferably 1.2 or more. The longitudinal stretching ratio of more than 1.3 will undesirably lead to increased shrinkage ratio in the longitudinal direction. The stretching ratio is preferably 1.28 or less, and particularly preferably 1.25 or less.

The stretching in the width direction is conducted by introducing longitudinally stretched film into a tenter where the film can be heated with both edge portions of the film being grasped by clips, heating the film to prescribed temperature with hot air, and increasing the distance between the clips while the film is being conveyed in the longitudinal direction.

The preheating temperature of the longitudinally stretched film is preferably Tg+30° C. or higher and Tg+80° C. or lower. The preheating temperature lower than Tg+30° C. is insufficient as the preheating temperature, and will cause high stretching stress, undesirably leading to breakage. Heating at a temperature higher than Tg+80° C. will decrease stretching stress in the width direction of the unstretched sheet, undesirably leading to decreased accuracy of thickness (i.e., thickness unevenness) in the width direction. The preheating temperature is more preferably Tg+40° C. or higher and +70° C. or lower.

The film temperature during stretching in the width direction is preferably Tg+5° C. or higher and Tg+30° C. or lower. The film temperature lower than Tg+5° C. will lead to too high stretching stress, undesirably resulting in breakage of the film. The film temperature higher than Tg+30° C. will lead to too low stretching stress, undesirably resulting in decreased heat shrinkage ratio at 90° C. in the width direction. The film temperature is more preferably Tg+8° C. or higher and Tg+25° C. or lower.

The stretching ratio in the width direction is preferably 3.4 or more and 5 or less. The stretching ratio of less than 3.4 will lead to insufficient stretching stress, undesirably resulting in decreased accuracy of thickness (i.e., thickness unevenness) in the width direction. The stretching ratio of more than 5 will undesirably lead to increased risk of breakage during film formation and require long and large facilities. The stretching ratio is more preferably 3.5 or more 4.8 or less. The film may be subjected to a heat treatment to control the shrinkage ratio after stretching in the width direction.

The stretching in the width direction is preferably divided into 2 or more stages. In the present invention, crystalline polyester raw materials are slightly stretched in the longitudinal direction, after that, the film is stretched in the width direction. Generally, molecules in the film is oriented in the direction of stretching, while molecular orientation in the direction orthogonal to the stretching direction is decreased. Therefore, first stretching in the width direction at low stretching ratio of 1.2 or more and 1.7 or less will decrease molecular orientation in the longitudinal direction of the film, leading to a decreased heat shrinkage ratio in the longitudinal direction. Furthermore, after first stage of stretching in the width direction, relaxation in the width direction (i.e., relaxation in TD) of 5% or more and 20% or less in a tenter will also relax molecules in the longitudinal direction and thus provide significant reduction in the heat shrinkage ratio in the longitudinal direction. The width of the film is maintained in a tenter after relaxation in the width direction, and the film is subjected to the second stage of stretching preferably by 2 times or more and 4.2 times or less.

After the second stage of stretching, the film is preferably subjected to the heat treatment at a temperature of stretching temperature or more and the stretching temperature+18° C. or lower in a tenter. The heat treatment temperature lower than the stretching temperature will lead to inability to achieve the purpose of the heat treatment process, which is the relaxation of molecular chain. The heat treatment temperature higher than the stretching temperature+18° C. will lead to a heat-shrinkable film with decreased heat shrinkage ratio, which is undesirable. The heat treatment temperature is more preferably the stretching temperature+1° C. or higher and the stretching temperature+15° C. or lower.

EXAMPLES

The present invention will be described in more detail with Examples, however, the scope of the present invention is not limited by the embodiments of Examples. The present invention can be carried out with modifications, if needed, in the range not departing from the scope of the present invention.

The followings are the evaluation methods of the films.

[Intrinsic Viscosity (IV)]

Intrinsic viscosity was measured at 30° C. by an Ostwald viscometer with the polyester (0.2 g) dissolved into a mixed solvent (50 ml) of phenol/1,1,2,2-tetrachloroethane (60/40, weight ratio). The unit is dl/g.

[Compositional Analysis]

Sample solution was prepared by dissolving each sample in a mixed solvent of chloroform D (manufactured by Eurisotop) and trifluoroacetic acid D1 (manufactured by Eurisotop) at a ratio of 10:1 (volume ratio). Proton NMR of the sample solution was measured with NMR (GEMINI-200, manufactured by Varian, Inc) at 23° C. with integration times of 64. In the NMR measurement, the peak intensities of predetermined protons were calculated, and the amount of the components in 100 mol % of acid component and the amount of the components in 100 mol % of polyol component were measured.

[Heat Shrinkage Ratio (Hot-Water Heat Shrinkage Ratio)]

The film was cut into a square of 10 cm×10 cm. After immersing in hot water at predetermined temperature±0.5°

C. for 10 seconds with no load and being heat-shrunk, the film was immersed in water at 25° C.±0.5° C. for 10 seconds, and pulled out of the water. The dimensions of the film in the longitudinal and the transverse directions were measured. The heat shrinkage ratio was calculated according to Equation 1. The direction having larger heat shrinkage ratio was determined as the main shrinkage direction.

heat shrinkage ratio={(film length before shrinkage−film length after shrinkage)/film length before shrinkage}×100(%) Equation 1:

[Tg (Glass Transition Point)]

Tg was measured in accordance with JIS K 7121-1987 by differential scanning calorimeter (type: DSC220, manufactured by Seiko Electronic Industry). Specifically, the unstretched film (10 mg) was heated from −40° C. to 120° C. at a heating rate of 10° C./min to measure an endothermic curve. A tangent line was drawn before and after the inflection point of the obtained endothermic curve, and the intersection was determined as the glass transition point (Tg; ° C.).

[Endothermic Peak Temperature][Amount of Endothermic Heat]

The measurement was conducted in accordance with JIS K 7121-1987 by a differential scanning calorimeter (type: DSC220, manufactured by Seiko Electronic Industry). The produced film (5 mg) was placed in a sample pan, and the sample pan was closed with a lid. The sample was heated to 300° C. at a heating rate of 10° C./min in a nitrogen gas atmosphere, and kept at 300° C. for 2 minutes after heating. The sample pan was then taken out for quenching with liquid nitrogen. After the quenching, the sample was returned to a normal temperature, and reheated from 30° C. to 300° C. at a heating rate of 10° C./min by differential scanning calorimeter. The endothermic peak at which the sample melted was determined as the endothermic peak temperature. The amount of endothermic heat in melting was determined from the endothermic peak area. Samples with no melting peak was determined to have no melting peak temperature and the amount of endothermic heat of 0.

[Amount of Exothermic Heat]

The measurement was conducted in accordance with JIS K 7121-1987 by a differential scanning calorimeter (type: DSC220, manufactured by Seiko Electronic Industry). The produced film (5 mg) was placed in a sample pan, and the sample pan was closed with a lid. The sample was heated to 300° C. at a heating rate of 10° C./min in a nitrogen gas atmosphere, and kept at 300° C. for 2 minutes after heating. The sample pan was then taken out for quenching with liquid nitrogen. After the quenching, the sample was returned to a normal temperature, and reheated from 30° C. to 300° C. at a heating rate of 10° C./min by differential scanning calorimeter. The amount of exothermic heat was determined from the exothermic peak area of the sample. Samples with no exothermic peak was determined to have no exothermic peak temperature and heat generation of 0.

[Film Thickness]

The measurement was conducted by a dial gauge in accordance with JIS K 7130-1999 A method.

[Film Density]

The film density of a square-shaped sample having a side of 3 mm was measured using a calcium nitrate aqueous solution in density gradient tube method described in JIS K 7112.

[Haze of Film]

The haze was measured using a sample cut out into a square having a side of 10 cm by a haze meter (NDH2000, manufactured by NIPPON DENSHOKU INDUSTRIES CO., LTD.) in accordance with JIS K 7361-1. The measurement was conducted at 3 points on the film, the average of the 3 points was determined as haze measurement value, and the haze of 20 μm equivalent value was calculated according to Equation 2.

haze=haze measurement value×20/film thickness (%/20 μm) Equation 2:

[Evaluation of Shrinkage Finishing Property]

Edges of the heat-shrinkable film were melted by an impulse sealer (manufactured by Fujiimpulse Co., Ltd.) to form an annular-shaped label having its circumferential direction in the width direction of the film. The label had a diameter of 68 mm in the label shrinkage direction. The label covered commercially available PET bottles (with contents, size: 500 ml, trunk diameter: 62 mm, minimum neck diameter: 25 mm) and was heat-shrunk with steam by passing through a steam tunnel (type: SH-1500-L, manufactured by Fuji Astec Inc.) set at 90° C. (tunnel passing time: 5 seconds). The shrinkage finishing property of the label was visually evaluated at 5 levels according to the following criteria. The defects described below include jumping, wrinkles, shrinkage insufficiency, folding of label edges, and whitening by shrinkage. The labels with the levels of 3 or more were acceptable.

5: the best in shrinkage finishing property (with no defects)
4: good in shrinkage finishing property (with 1 defect)
3: with 2 defects
2: with 3 to 5 defects
1: with many defects (6 or more defects)

[Variation of Recycled PET Resin]

After removal of the contents and wash with water, the PET bottles (size: 500 ml) and the labels that were evaluated for the shrinkage finishing property were shattered with a pulverizer (type: 48, manufactured by Fjtex Co., Ltd) to a fluff with the size of 8 to 10 mm.

The fluff was melted at 280° C. and produced to pellets of recycled PET resin by a pelletizer (SRH-V55/48, manufactured by Nihon Yuki Co., Ltd.), at a discharge amount of 120 kg per 1 hour for 30 minutes. The recycled PET resin was cut to the size of 3±0.8 mm (2.2 to 3.8 mm) in length, and 30±10 mg/pellet (20 to 40 mg/pellet) in pellet weight. After 5 minutes, 15 minutes, and 25 minutes from the start of the pellet production, 300 pellets of recycled PET resin were sampled, respectively (totally 900 pellets), to measure the size. The resin was judged in the manner described below, and the resin judged to be good was acceptable.

Good: the amount of the resin out of the size (length, pellet weight) is 10% or less of the total amount, and the resin is produced with no troubles such as pulsation.

Fair: the amount of the resin out of the size (length, pellet weight) is 30% or less of the total amount, and the resin is produced with troubles such as pulsation of 2 times or less.

Bad: the amount of the resin out of the size (length, pellet weight) is more than 30% of the total amount, and the pellet is produced with troubles such as pulsation of 3 times or more.

[Preparation of Polyester Raw Material]

Synthesis Example 1

In a stainless steel autoclave equipped with an agitator, a thermometer, and a partial circulation type cooler, 100 mol % of dimethyl terephthalate (DMT) as a dicarboxylic acid component and 100 mol % of ethylene glycol (EG) as a polyol component were charged such that the mole ratio of ethylene glycol to dimethyl terephthalate became 2.2 times. Zinc acetate was added as a transesterification catalyst at a ratio of 0.05 mol % (to the acid component), antimony trioxide was added as a polycondensation catalyst at a ratio of 0.225 mol % (to the acid component), and transesterification reaction was carried out while methanol byproduct was being distilled away from the system. After that, polycondensation reaction was carried out at 280° C. under a reduced pressure of 26.7 Pa to give polyester A with an intrinsic viscosity of 0.75 dl/g. The composition of polyester A is shown in Table 1.

Synthesis Examples 2 to 5

Polyester B to D shown in Table 1 was produced in the manner as that of Synthesis Example 1. In the production of polyester B, $SiO_2$ (SYLYSIA 266, average particle diameter: 3 μm, manufactured by FUJI SILYSIA CHEMICAL LTD.) was added as a lubricant in a proportion of 20000 ppm with respect to the polyester. The intrinsic viscosity of polyester B to D was 0.75 dl/g.

Each polyester was prepared in the shape of chips, if needed. The composition of each polyester is shown in Table 1.

TABLE 1

| | Composition of polyester raw material (mol %) | | | | | Amount of lubricant | Intrinsic viscosity |
|---|---|---|---|---|---|---|---|
| | Dicarboxylic acid component | | Polyol component | | | | |
| | DMT | IPA | EG | DEG | NPG | (ppm) | (dl/g) |
| Polyester A | 100 | 0 | 99 | 1 | 0 | 0 | 0.75 |
| Polyester B | 100 | 0 | 99 | 1 | 0 | 20000 | 0.75 |
| Polyester C | 100 | 0 | 60 | 40 | 0 | 0 | 0.75 |
| Polyester D | 90 | 10 | 99 | 1 | 0 | 0 | 0.75 |
| Polyester E | 100 | 0 | 69 | 1 | 30 | 0 | 0.75 |

※ DMT: Dimethyl terephthalate
IPA: Isophthalic acid
EG: Ethylene glycol
DEG: Diethylene glycol
NPG: Neopentyl glycol

Example 1

Polyester A, polyester B, and polyester C were mixed at a weight ratio of 67:3:30, and introduced to an extruder. The mixed resin was melted at 273° C. with a screw having 4 shafts, extruded from a T-die while being cooled to 260° C., and rapidly cooled by being wound around a rotating metal roll cooled at a surface temperature of 20° C. to produce an unstretched film with a thickness of 201 μm. Tg of the unstretched film was 65° C.

The unstretched film was introduced to a longitudinal stretching machine, preheated with a roll set at a surface temperature of Tg+10° C. (75° C.), and stretched in the longitudinal direction by 1.2 times by the speed difference between rolls. The film after uniaxial stretching in the longitudinal direction was introduced to a tenter, and preheated until the film temperature reached Tg+45° C. (110° C.) while both edges portions of the film were being grasped by clips. After that, the film was subjected to the first stage of stretching at Tg+10° C. (75° C.) by 1.5 times in the transverse direction followed by relaxation at Tg+10° C. (75° C.) by 10% in the width direction, and the film was subjected to the second stage of stretching at Tg+10° C. (75° C.) by 3.1 times (total stretching ratio: 4.2). The film was then heat fixed at Tg+12° C. (77° C.). Both edge portions of the film after stretching were cut out to continuously produce a biaxially stretched film with about 40 μm over predetermined length, and the film roll consisting of the heat-shrinkable polyester film was produced. The characteristics of thus produced film was evaluated by the method described above. Table 2 shows conditions for film formation and Table 3 shows evaluation results.

The film had no practical problems in the shrinkage finishing property, and the variation of recycled PET resin.

Example 2

Polyester A, polyester B, and polyester C were mixed at a weight ratio of 77:3:20 and introduced to an extruder. The unstretched film with a thickness of 201 μm was produced similarly as Example 1. Tg of the unstretched film was 70° C.

The unstretched film was stretched similarly as Example 1, and the film roll consisting of the heat-shrinkable polyester film with a thickness of 40 μm was produced. Since Tg of the film was different from that of Example 1, conditions of temperature for stretching were changed to Tg+10° C. (80° C.), Tg+45° C. (115° C.), and Tg+12° C. (82° C.). The characteristics of thus produced film was evaluated by the method described above. Table 2 shows conditions for film formation and Table 3 shows evaluation results.

The film had no practical problems in the shrinkage finishing property, and the variation of recycled PET resin.

Example 3

Polyester A, polyester B, and polyester C were mixed at a weight ratio of 92:3:5 and introduced to an extruder. The unstretched film with a thickness of 201 μm was produced similarly as Example 1. Tg of the unstretched film was 74° C.

The unstretched film was stretched similarly as Example 1, and the film roll consisting of the heat-shrinkable polyester film with a thickness of 40 μm was produced. Since Tg of the film was different from that of Example 1, conditions of temperature for stretching were changed to Tg+10° C. (84° C.), Tg+45° C. (119° C.), and Tg+12° C. (86° C.). The characteristics of thus produced film was evaluated by the method described above. Table 2 shows conditions for film formation and Table 3 shows evaluation results.

The film had no practical problems in the shrinkage finishing property, and the variation of recycled PET resin.

Example 4

Polyester A, polyester B, polyester C, and polyester D were mixed at a weight ratio of 52:3:5:40 and introduced to an extruder. The unstretched film with a thickness of 201 μm was produced similarly as Example 1. Tg of the unstretched film was 74° C.

The unstretched film was stretched similarly as Example 1, and the film roll consisting of the heat-shrinkable polyester film with a thickness of 40 μm was produced. Since Tg of the film was different from that of Example 1, conditions of temperature for stretching were changed to Tg+10° C. (84° C.), Tg+45° C. (119° C.), and Tg+12° C. (86° C.). The characteristics of thus produced film was evaluated by the method described above. Table 2 shows conditions for film formation and Table 3 shows evaluation results.

The film had no practical problems in the shrinkage finishing property, and the variation of recycled PET resin.

Example 5

Polyester A, polyester B, polyester C, and polyester D were mixed at a weight ratio of 57:3:30:10 and introduced to an extruder. The unstretched film with a thickness of 201 μm was produced similarly as Example 1. Tg of the unstretched film was 65° C.

The unstretched film was stretched similarly as Example 1, and the film roll consisting of the heat-shrinkable polyester film with a thickness of 40 μm was produced. Table 2 shows conditions for film formation and Table 3 shows evaluation results.

The film had no practical problems in the shrinkage finishing property, and the variation of recycled PET resin.

Example 6

Polyester A, polyester B, polyester C, and polyester D were mixed at a weight ratio of 67:3:20:10 and introduced to an extruder. The unstretched film with a thickness of 201 μm was produced similarly as Example 1. Tg of the unstretched film was 70° C.

The unstretched film was stretched similarly as Example 1, and the film roll consisting of the heat-shrinkable polyester film with a thickness of 40 μm was produced. Since Tg of the film was different from that of Example 1, conditions of temperature for stretching were changed to Tg+10° C. (80° C.), Tg+45° C. (115° C.), and Tg+12° C. (82° C.). The characteristics of thus produced film was evaluated by the method described above. Table 2 shows conditions for film formation and Table 3 shows evaluation results.

The film had no practical problems in the shrinkage finishing property, and the variation of recycled PET resin.

Comparative Example 1

Polyester A, polyester B, and polyester C were mixed at a weight ratio of 47:3:50 and introduced to an extruder. The mixed resin was melted at 273° C. with a screw having 4 shafts, extruded from a T-die while being cooled to 260° C., and rapidly cooled by being wound around a rotating metal roll cooled at a surface temperature of 20° C. to produce an unstretched film with a thickness of 201 μm. Tg of the unstretched film was 58° C.

The unstretched film was introduced to a longitudinal stretching machine, preheated with a roll set at a surface temperature of Tg+10° C. (68° C.), and stretched in the longitudinal direction by 1.2 times by the speed difference between the rolls. The film after uniaxial stretching in the longitudinal direction was introduced to a tenter, and preheated until the film temperature reached Tg+45° C. (103° C.) while both edges portions of the film were being grasped by clips. After that, the film was subjected to the first stage of stretching at Tg+10° C. (68° C.) by 1.5 times in the transverse direction times followed by relaxation at Tg+10° C. (68° C.) by 10% in the width direction, and the film was subjected to the second stage of stretching at Tg+10° C. (68° C.) by 3.1 times (total stretching ratio: 4.2). The film was then heat fixed at Tg+12° C. (70° C.). Both edge portions of the film after stretching were cut out to continuously produce a biaxially stretched film with about 40 μm over a predetermined length, and the film roll consisting of the heat-shrinkable polyester film was produced. The characteristics of thus produced film was evaluated by the method described above. Table 2 shows conditions for film formation and Table 3 shows evaluation results.

The film had no practical problems in the shrinkage finishing property, however, the recycled PET resin produced by mixing of the film with PET bottles had increased variation of size, leading to one time of trouble due to pulsation during pellets production.

Comparative Example 2

Polyester B, polyester C, and polyester D were mixed at a weight ratio of 3:7:90 and introduced to an extruder. The unstretched film with a thickness of 201 μm was produced similarly as Example 1. Tg of the unstretched film was 73° C.

The unstretched film was stretched similarly as Example 1, and the film roll consisting of the heat-shrinkable polyester film with a thickness of 40 μm was produced. Since Tg of the film was different from that of Example 1, conditions of temperature for stretching were changed to Tg+10° C. (83° C.), Tg+45° C. (118° C.), and Tg+12° C. (85° C.). The characteristics of thus produced film was evaluated by the method described above. Table 2 shows conditions for film formation and Table 3 shows evaluation results.

The film had no practical problems in the shrinkage finishing property, however, the recycled PET resin produced by mixing of the film with PET bottles had increased variation of size, leading to two times of troubles due to pulsation during pellets production.

Comparative Example 3

Polyester A, polyester B, polyester C, and polyester E were mixed at a weight ratio of 12:3:5:80 and introduced to an extruder. The unstretched film with a thickness of 201 μm was produced similarly as Example 1. Tg of the unstretched film was 74° C.

The unstretched film was stretched similarly as Example 1, and the film roll consisting of the heat-shrinkable polyester film with a thickness of 40 μm was produced. Since Tg of the film was different from that of Example 1, conditions of temperature for stretching were changed to Tg+10° C. (83° C.), Tg+45° C. (118° C.), and Tg+12° C. (85° C.). The characteristics of thus produced film was evaluated by the method described above. Table 2 shows conditions for film formation and Table 3 shows evaluation results.

The film had high shrinkage finishing property, however, the recycled PET resin produced by mixing of the film with PET bottles had increased variation of size, leading to frequent troubles due to pulsation during pellets production.

TABLE 2A

| | Ratio of raw materials | Glass transition point (° C.) | IPA ratio (mol %) | DEG ratio (mol %) | NPG ratio (mol %) |
|---|---|---|---|---|---|
| Example 1 | A/B/C = 67/3/30 | 65 | 0 | 12.7 | 0 |
| Example 2 | A/B/C = 77/3/20 | 70 | 0 | 8.8 | 0 |
| Example 3 | A/B/C = 92/3/5 | 74 | 0 | 3 | 0 |
| Example 4 | A/B/C/D = 52/3/5/40 | 74 | 4 | 3 | 0 |
| Example 5 | A/B/C/D = 57/3/30/10 | 65 | 1 | 12.7 | 0 |
| Example 6 | A/B/C/D = 67/3/20/10 | 70 | 1 | 8.8 | 0 |

TABLE 2A-continued

| | Ratio of raw materials | Glass transition point (° C.) | IPA ratio (mol %) | DEG ratio (mol %) | NPG ratio (mol %) |
|---|---|---|---|---|---|
| Comparative Example 1 | A/B/C = 47/3/50 | 58 | 0 | 20.5 | 0 |
| Comparative Example 2 | B/C/D = 3/7/90 | 73 | 9 | 3.7 | 0 |
| Comparative Example 3 | A/B/C/E = 12/3/5/80 | 74 | 0 | 3 | 24 |

TABLE 2B

| | Conditions for longitudinal stretching | | Conditions for transverse stretching | | | | | | |
|---|---|---|---|---|---|---|---|---|---|
| | | | | Stretching conditions | | | | | |
| | | | | | Stretching ratio | | | | |
| | Preheating temperature (° C.) | Ratio | Preheating temperature (° C.) | Temperature (° C.) | First stage (times) | Relaxation in width direction | Second stage (times) | Total ratio (times) | Heat fixing temperature (° C.) |
| Example 1 | 75 | 1.2 | 110 | 75 | 1.5 | 10 | 3.1 | 4.2 | 77 |
| Example 2 | 80 | 1.2 | 115 | 80 | 1.5 | 10 | 3.1 | 4.2 | 82 |
| Example 3 | 84 | 1.2 | 119 | 84 | 1.5 | 10 | 3.1 | 4.2 | 86 |
| Example 4 | 84 | 1.2 | 119 | 84 | 1.5 | 10 | 3.1 | 4.2 | 86 |
| Example 5 | 75 | 1.2 | 110 | 75 | 1.5 | 10 | 3.1 | 4.2 | 77 |
| Example 6 | 80 | 1.2 | 115 | 80 | 1.5 | 10 | 3.1 | 4.2 | 82 |
| Comparative Example 1 | 68 | 1.2 | 103 | 68 | 1.5 | 10 | 3.1 | 4.2 | 70 |
| Comparative Example 2 | 83 | 1.2 | 118 | 83 | 1.5 | 10 | 3.1 | 4.2 | 85 |
| Comparative Example 3 | 84 | 1.2 | 119 | 84 | 1.5 | 10 | 3.1 | 4.2 | 86 |

TABLE 3

| | Intrinsic viscosity (dl/g) | Hot-water heat shrinkage ratio at 90° C. for 10 seconds (%) Width direction | Longitudinal direction | DSC Endothermic peak temperature (° C.) | Amount of exothermic heat (mJ/mg) | Amount of endothermic heat (mJ/mg) | Density (g/cm$^3$) | Thickness (μm) | Haze (%/20 μm) | Shrinkage finishing property | Variation of recycled PET resin |
|---|---|---|---|---|---|---|---|---|---|---|---|
| Example 1 | 0.67 | 67 | 3 | 249 | 33 | 30 | 1.368 | 40 | 3.8 | 4 | Good |
| Example 2 | 0.68 | 65 | 5 | 252 | 41 | 41 | 1.381 | 40 | 4 | 3 | Good |
| Example 3 | 0.69 | 61 | 6 | 254 | 50 | 55 | 1.388 | 40 | 3.8 | 3 | Good |
| Example 4 | 0.69 | 66 | 4 | 252 | 35 | 30 | 1.38 | 40 | 3.9 | 4 | Good |
| Example 5 | 0.67 | 69 | 1 | 257 | 24 | 20 | 1.364 | 40 | 4 | 4 | Good |
| Example 6 | 0.68 | 66 | 4 | 251 | 38 | 37 | 1.378 | 40 | 3.8 | 4 | Good |
| Comparative Example 1 | 0.65 | 75 | 3 | 239 | 7 | 5 | 1.36 | 40 | 3.5 | 4 | Fair |
| Comparative Example 2 | 0.69 | 48 | 11 | 247 | 7 | 4 | 1.364 | 40 | 3.8 | 3 | Fair |
| Comparative Example 3 | 0.68 | 75 | 3 | N/A | 0 | 0 | 1.315 | 40 | 3.5 | 5 | Bad |

INDUSTRIAL APPLICABILITY

Though the heat-shrinkable polyester film of the present invention has high heat shrinkage ratio, the raw material component for the film is similar to that for beverage PET bottles. Therefore, mixing of the used label of the heat-shrinkable polyester film in the production process of recycled PET resin from PET bottles does not interfere the production of recycled PET resin of stable quality.

The invention claimed is:

1. A heat-shrinkable polyester film, comprising, 95 mol % or more and 100 mol % or less of dicarboxylic acid, and 0 mol % or more and 5 mol % or less of isophthalic acid in 100 mol % of whole dicarboxylic acid component, 85 mol % or more and 98 mol % or less of ethylene terephthalate unit in 100 mol % of whole ester unit, and 2 mol % or more and 15 mol % or less of diethylene glycol in 100 mol % of whole polyol component, and satisfying the requirements (1) to (5):

(1) a hot-water heat shrinkage ratio in a width direction of the film is 40% or more and 70% or less by immersing the film in a hot water at 90° C. for 10 seconds, (2) a hot-water heat shrinkage ratio in a longitudinal direction of the film is-5% or more and 15% or less by immersing the film in a hot water at 90° C. for 10 seconds, (3) an endothermic peak temperature in melting is 245° C. or higher and 260° C. or lower through differential scanning calorimetry (DSC) in heating the film to 300° C. to be melted, quenching the film, and then re-heating the film to 300° C., (4) an amount of exothermic heat in crystallizing is 10 mJ/mg or more through differential scanning calorimetry (DSC) in heating the film to 300° C. to be melted, quenching the film, and then re-heating the film to 300° C., and (5) an amount of endothermic heat in melting is 10 mJ/mg or more through differential scanning calorimetry (DSC) in heating the film to 300° C. to be melted, quenching the film, and then re-heating the film to 300° C.

2. The heat-shrinkable polyester film according to claim 1, wherein a density of the film is 1.33 g/cm$^3$ or more and 1.39 g/cm$^3$ or less.

3. The heat-shrinkable polyester film according to claim 1, wherein a haze of the film is 2% or more and 10% or less at a film thickness of 20 μm.

4. A heat-shrinkable label, comprising the heat-shrinkable polyester film according to claim 1.

5. A package product, characterized in that the package product is produced by covering at least a part of periphery of an object for packaging with the heat-shrinkable label according to claim 4, and then shrinking the heat-shrinkable label by heat.

6. The heat-shrinkable polyester film according to claim 1, the film made into a heat-shrinkable label is recyclable as a raw material for PET bottles.

* * * * *